J. M. COOLEY.
FLY TRAP.
APPLICATION FILED MAY 24, 1913.
1,102,141. Patented June 30, 1914.
2 SHEETS—SHEET 2.
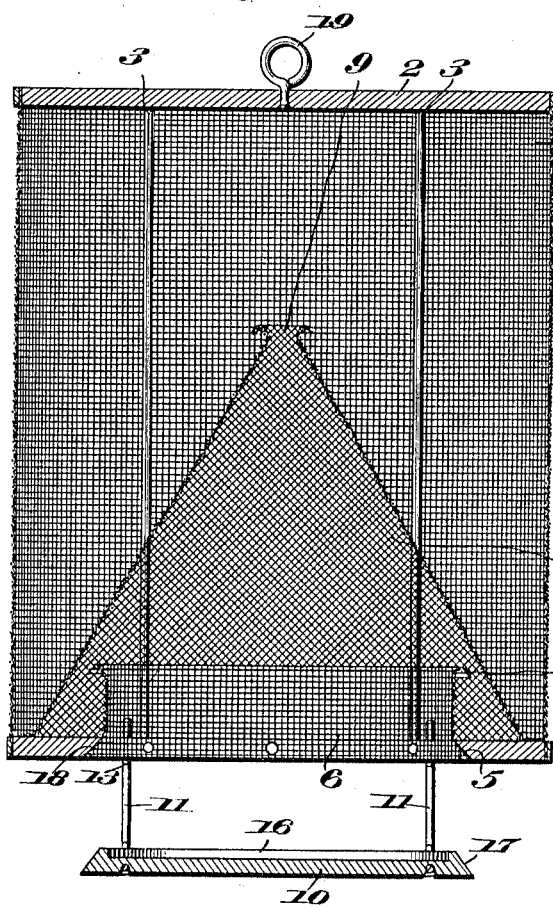
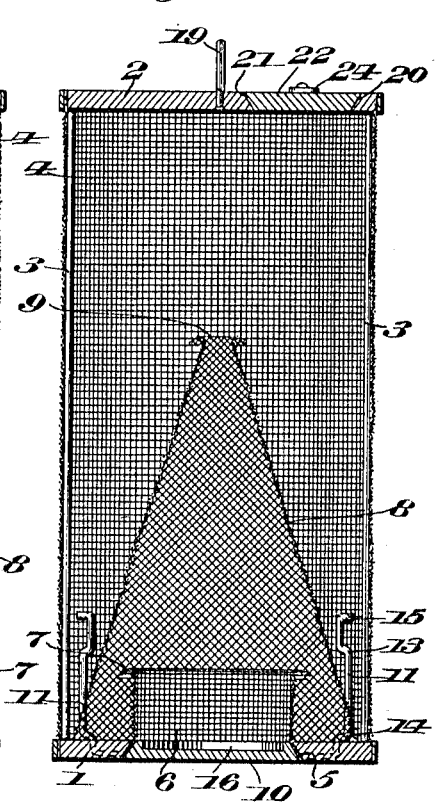
Witnesses
Inventor
John M. Cooley
By Victor J. Evans
Attorney

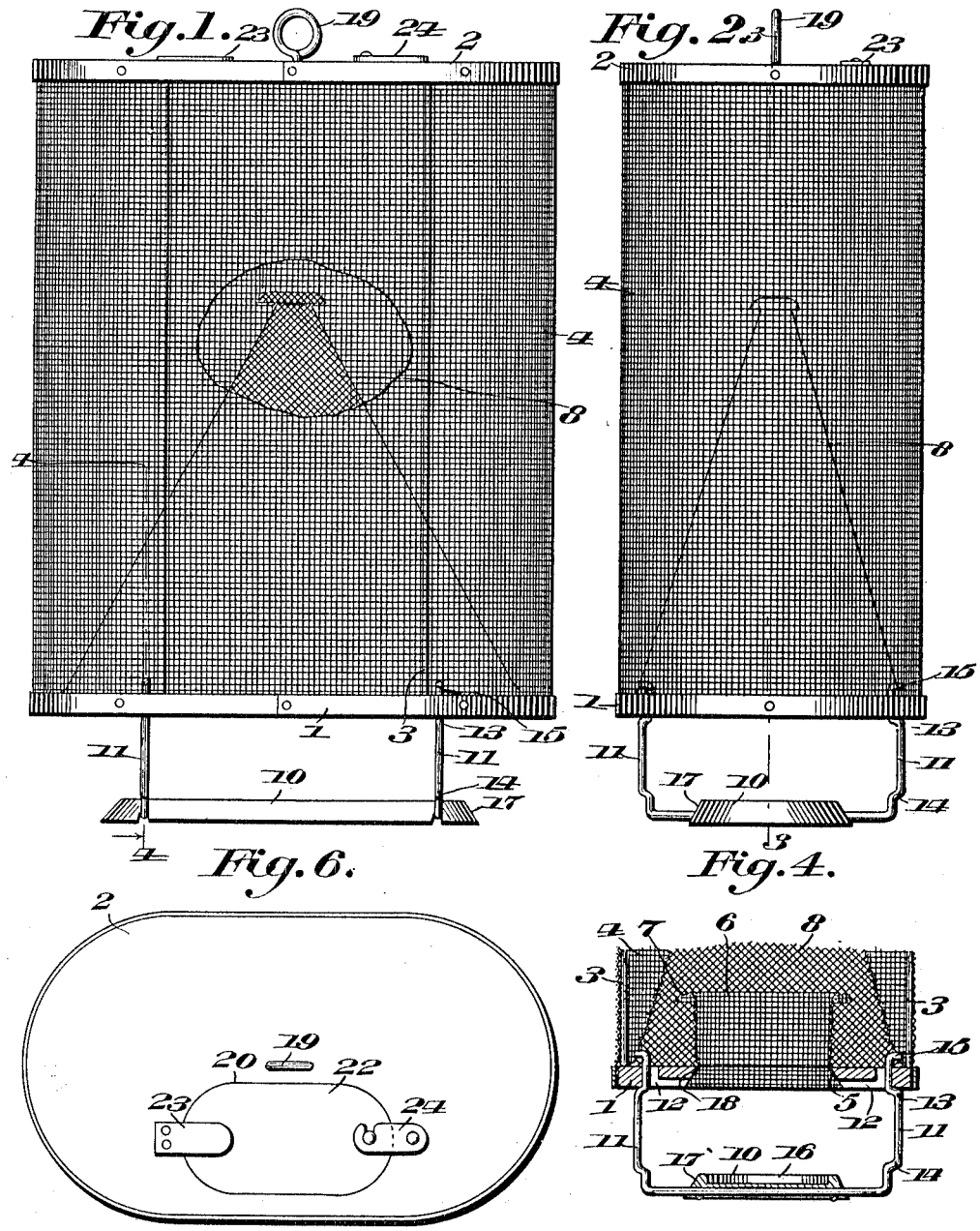

UNITED STATES PATENT OFFICE.

JOHN MORGAN COOLEY, OF FAYETTEVILLE, ARKANSAS.

FLY-TRAP.

1,102,141. Specification of Letters Patent. Patented June 30, 1914.

Application filed May 24, 1913. Serial No. 769,668.

*To all whom it may concern:*

Be it known that I, JOHN M. COOLEY, a citizen of the United States, residing at Fayetteville, in the county of Washington and State of Arkansas, have invented new and useful Improvements in Fly-Traps, of which the following is a specification.

This invention relates to fly traps.

One of the objects of the invention resides in the provision of a novel form of combined bottom, support and bait container which is adapted to completely close the trap against ingress and egress and which is also adapted to support the trap in raised or operative position.

Another object of the invention is the provision of a fly trap having a foraminous guard arranged within the cone to prevent the flies upon the interior of the same from gaining access to the entrance opening.

Still another object of the invention resides in the provision of novel and efficient means for supporting the trap in elevated position above the bottom so that the same may be conveniently lowered by pressure upon the upper end of the trap and whereby the bottom will be locked to the trap and will close the same.

Further objects of the invention will appear as the following description is read in connection with the accompanying drawings, which form a part of this application and in which—

Figure 1 is a side elevation showing the trap supported upon the auxiliary bottom or bait pan. Fig. 2 is an end elevation thereof. Fig. 3 is a vertical section taken on the line 3—3 of Fig. 2. Fig. 4 is a transverse section taken on the line 4—4 of Fig. 1. Fig. 5 is a similar view showing the auxiliary bottom or bait pan in closed position. Fig. 6 is a top plan view.

Referring more particularly to the drawing, 1 represents the main bottom and 2 the top of the trap, which parts are held in separated relation by means of the brace rods or uprights 3. Surrounding these brace rods and secured to the bottom 1 and to the top 2 is a foraminous fabric 4 preferably in the nature of fly screen wire. The bottom 1 is apertured, as shown at 5, and extending up inwardly of the trap and secured to the inner walls of the aperture is a guard strip 6 also formed of foraminous fabric and provided with an outwardly flaring upper edge or flange 7. Secured to the bottom 1 surrounding and separated from the guard strip is a cone 8 of foraminous material having an open upper end, the fabric from which the cone is formed being turned outwardly and left rough so as to form an obstacle to prevent the flies gaining access to said opening, the opening being indicated at 9.

When in operative position the trap is supported upon an auxiliary bottom 10 which has secured thereto separate pairs of spring supporting legs 11, each arranged to pass the aperture 12 in the bottom 1 and each being provided with oppositely disposed cam-shaped shoulders 13 and 14 arranged so as to engage the inner and outer portions of the bottom for supporting the trap and holding the auxiliary bottom in locked position, as will be hereinafter described. Each pair of legs is connected together and the members of each pair are normally spread apart by the inherent resiliency of the connecting member so that when the bottom is arranged in the position shown in Fig. 1 the shoulders 13 will engage with the under side of the bottom 1 and support the trap in elevated position above the auxiliary bottom 10.

Upon pressure being exerted upon the top 2 the legs will spring inwardly toward each other and will pass through the apertures 12 in the bottom 1 so as to permit the shoulders 14 to engage the inner surface of the bottom 1 and lock the auxiliary bottom in closed position, thus preventing all escape of flies in the main portion of the trap or in the cone. The upper end of each leg is provided with a hook 15 which prevents accidental disengagement of the legs from the bottom 1.

The auxiliary bottom has its upper surface recessed, as shown at 16, to provide a receptacle for bait or for a bait pan which may be secured therein. This bottom has its edge walls outwardly beveled, as shown at 17, so as to fit the inwardly beveled walls 18 of the aperture or entrance opening 6. In this manner a tight fit is assured so as to prevent the escape of any insects within the cone.

The top 2 is preferably provided with an eye 19 for supporting the trap when necessary and adjacent this eye there is an aperture or opening 20 formed in the top having inwardly beveled walls 21 to receive the lid 22 which is provided with the outwardly beveled edge walls to fit the walls 21 of the opening 20. The lid 22 is held in closed position by retaining members 23 and 24, the former of which is secured permanently to the top 2 and is adapted to overhang the lid, the lid being inserted thereunder when placed in position, and the latter retaining member being pivoted to the top 2 and adapted to swing over the lid and engage with the headed stud thereon.

In the operation of the device, the trap is supported as shown in Fig. 1 and suitable bait is placed upon the auxiliary base or bottom or upon a bait pan arranged in the recess 16 therein. The flies after feeding upon the bait fly up into the cone and pass through the opening into the main body of the trap. If any flies walk down the side of the cone to the bottom 1 they cannot find access to the aperture or entrance openings on account of the strip 5, the outwardly flaring upper flange of which guides them toward the cone again. Flies crawling up the outside of the cone will encounter the roughened edge of the cone which guides them away from the opening 9.

When it is desired to kill the flies in the trap the top is pressed upon which causes the spring legs to flex inwardly and thereby closing the auxiliary bottom upon the main bottom, thus preventing the escape of any flies within the cone. The shoulders 14 on the legs then engage the inner surface of the bottom 1 and lock the auxiliary bottom in place.

What is claimed is:—

1. A trap comprising separated bottom and top members, a foraminous wall connecting the top and bottom members, said bottom member being apertured and means to rest upon and raise the trap above a support, said means adapted to close said aperture.

2. A trap comprising separated top and bottom members, a foraminous wall connected to said top and bottom members, said bottom member having an entrance aperture, an auxiliary bottom arranged to close said aperture and means carried by said auxiliary bottom for supporting the trap above the same.

3. A trap comprising separated bottom and top members, a foraminous wall connecting said bottom and top members, said bottom being apertured, an auxiliary bottom member adapted to close said aperture, legs carried by the bottom member and means formed on the legs for supporting the trap in elevated position and for locking the auxiliary bottom in position to close the aperture.

4. A trap comprising separated bottom and top members, uprights for supporting the top member from the bottom member, a foraminous wall connected to the bottom and top members and surrounding said uprights, said bottom member being apertured, an auxiliary bottom member adapted to close said aperture, pairs of spring legs carried by said auxiliary bottom member, means on the spring legs for engaging the bottom to hold the trap in elevated position above the auxiliary bottom and means for locking the auxiliary bottom in position to close the aperture.

5. A trap comprising a casing having top and bottom members and a foraminous wall, said bottom member being apertured, an auxiliary bottom member, spring legs carried by the auxiliary bottom member and passing through the main bottom member, cam shoulders formed upon the spring legs adapted to engage the under side of the bottom member for supporting the trap in elevated position above the auxiliary bottom member and cam shoulders formed on the spring legs for engaging the inner side of the main bottom member for locking the auxiliary bottom member in position to close the aperture.

In testimony whereof I affix my signature in presence of two witnesses.

JOHN MORGAN COOLEY.

Witnesses:
R. B. NIXON,
H. M. MOORE.

---

Copies of this patent may be obtained for five cents each, by addressing the "Commissioner of Patents, Washington, D. C."